United States Patent [19]

Buckingham et al.

[11] 4,072,845

[45] Feb. 7, 1978

[54] WELDING ELECTRODE

[75] Inventors: Herbert Charles Buckingham, St. Albans; Raymond Elliott, Boreham Wood, both of England

[73] Assignee: BOC Limited, London, England

[21] Appl. No.: 599,584

[22] Filed: July 28, 1975

[51] Int. Cl.² .............................................. B23K 35/00
[52] U.S. Cl. ................... 219/146.3; 219/74; 219/76.14
[58] Field of Search ............ 219/146, 137 R, 74, 219/76

[56] References Cited

U.S. PATENT DOCUMENTS

| | | | |
|---|---|---|---|
| 3,177,340 | 4/1965 | Yanhier | 219/146 |
| 3,787,658 | 1/1974 | Kammer | 219/146 |
| 3,800,120 | 3/1974 | Helton | 219/146 |
| 3,851,143 | 11/1974 | Bishel | 219/146 X |
| 3,868,491 | 2/1975 | Ito | 219/146 |
| 3,919,517 | 11/1975 | Ishizaki | 219/146 X |

FOREIGN PATENT DOCUMENTS

| | | | |
|---|---|---|---|
| 1,080,703 | 8/1967 | United Kingdom | 219/146 |

*Primary Examiner*—E. A. Goldberg
*Attorney, Agent, or Firm*—Dennison, Dennison, Meserole & Pollack

[57] ABSTRACT

A metallic powder and flux-cored arc-welding or hard-surfacing electrode having improved metal deposition rate for gas-shielded arc-welding or hard-surfacing processes is disclosed wherein about 24 to about 35% of the total weight of the electrode is contributed by the core and the core is characterized by a relatively low flux content and high metallic powder content in the order of about 80% or greater, which metallic powder is preferably powdered iron.

13 Claims, No Drawings

WELDING ELECTRODE

BACKGROUND OF THE INVENTION

1. Field of Invention

This invention relates to flux cored welding electrodes for use in gas-shielded electric arc welding and hard surfacing.

2. Summary of the Prior Art

In open-arc welding of steel it is known to use a tubular welding electrode filled uniformly throughout its length with a powdery mixture of slag-forming, deoxidising and arc stabilising substances and, on occasion, metal powders. The nature and proportions of the respective ingredients used depend upon the desired conditions of use; for most welding applications it is customary to employ a core having at least 20% by weight of the core material ingredients other than metal powders, whereas in hard surfacing applications more metal powder is normally used. The inclusion of iron powder in the core is advantageous in that it helps to increase the rate at which weld metal is able to be deposited from the electrode. In general, it is found that commercial flux-cored welding electrodes of the high metallic hardfacing types have the disadvantages of producing a great deal of spatter during use and of forming a scaly slag which is difficult to remove. In addition they frequently produce welds of poor shape. Electrodes having a higher flux content often suffer from the disadvantage that they deposit weld metal at a rate which is less than ideal.

Certain arc welding electrodes have been proposed which contain relatively small proportions of inorganic compounds which act as fluxing agents, slag forming agents and arc stabilisers. For example U.S. Pat. No. 3,787,658 describes flux-cored electrodes for producing ferrous weld deposits when employed as the consumable electrode in a short-circuiting arc welding process, the electrodes typically containing less than 1% (by weight of the total electrode) of inorganic compounds, from 1 to 2.5% by weight of manganese, less than 0.9% by weight of silicon and a core that constitutes from 10 to 15% by weight of the electrode.

U.S. Pat. No. 3,177,340 relates to flux-cored electrodes for use in an electrogas welding process. The electrodes typically have a core containing less than 1% by weight of the total electrode of inorganic compounds and unspecified quantities of other ingredients.

UK patent specification No. 1,056,804 relates to flux-cored arc welding electrodes for use in gas-shielded arc welding. In order to improve upon the efficiency during welding of conventional electrodes this specification recommends a core composition containing silica and titanium dioxide, the total weight of these ingredients constituting at least 3.5% by weight and at the most 9% by weight of the total weight of the welding electrode.

UK patent specification No. 1,071,149 relates to flux-cored arc welding electrodes for use in gas-shielded arc welding. The electrodes typically contain from 1 to 9% by weight of the total electrode of alkaline earth carbonate and alkaline earth fluoride. In addition the electrodes typically contain from 1.5 to 2.0% by weight of manganese and less than 1% by weight of silicon.

UK patent specification No. 1,123,926 relates to flux-cored electrodes for automatic or semi-automatic arc welding. The electrodes typically contain less than 1% by weight of inorganic compounds and are highly deoxidised which suggest that the electrodes are intended for use without an externally supplied shielding gas.

SUMMARY OF THE INVENTION

It is an object of the invention to provide a flux-cored arc-welding or hard facing wire for use in a gas-shielded arc welding or hard facing process which contains an inorganic as a flux forming or slag-forming agent but which is able to deposit weld metal at a rate generally faster to that at which all-metal electrodes deposit metal.

Another object of the present invention is to provide a flux-cored arc-welding or hard facing wire for use in a gas-shielded arc welding or hard facing process which is able to deposit welds of good appearance.

A further object of the present invention is to provided a flux-cored arc-welding wire for use in a gas-shielded arc welding or hard surfacing process which does not give heavy deposits of slag but instead forms shallow friable deposits of slag which immediately remelt on a succeeding passes, whereby multipass welding without deslagging between passes is made possible.

According to one aspect of the present invention there is provided fo gas-shielded electric arc welding or hardfacing an electrode in the form of a flux-cored wire having a tubular casing of which the main constituent is iron; which casing contains dry core material comprising an intimate mixture of powdered metal, deoxidant and flux-forming agent, the electrode containing by weight of the total electrode:

0.08 to 1.2% of the flux-forming agent
1 to 5.25% of deoxidant, and
at least 20% of powdered metal,
the balance being provided by the tubular casing.

Electrodes according to the invention make possible a deposition rate generally at least equal to or greater than that given by conventional all-metal electrodes, a recovery as weld metal of about 95% of the total weight of the electrode, and deposition of a weld metal which has acceptable metallurgical properties and is thus suitable for many gas shielded arc welding applications. Moreover, the electrodes according to the invention give relatively small quantities of slag and welds of relatively good appearance. This combination of properties is, we believe, not exhibited by conventional flux-cored electrodes for use in gas-shielded arc-welding processes or by those electrodes described in the patent specifications mentioned hereinabove.

The flux-forming material may comprise compounds termed in the art as being acidic, compounds termed in the art as being basic, or a mixture of both acidic and basic compounds. The flux forming material may alternatively or in addition comprise amphoteric compounds.

A preferred acidic flux-forming material for use in the present invention is a silicate or a titanate. The silicate or titanate may advantageously be the sole flux-forming material in the electrode according to the present invention. An alkali metal silicate or an alkali metal titanate is preferred if the flux-forming material is required to comprise a silicate or a titanate. If the electrode contains an acidic flux-forming agent, the preferred content of the acidic flux-forming agent is in the range 0.1 to 0.6% by weight of the total weight of the electrode.

We have found that if the flux-forming material comprises at least one silicate or titanate the electrode according to the present invention when used in open-arc gas-shielded welding processes gives less spatter and produces welds of better shape than do conventional commercial flux-cored arc-welding electrodes while giving in comparison to cored welding electrodes containing no flux-forming material a more stable arc and a weld metal having better metallurgical properties. Sodium silicate, sodium titanate, potassium silicate and potassium titanate in particular all have good arc-stabilising properties. Lithium silicate, lithium titanate, aluminium silicate, manganese silicate, zirconium silicate or calcium silicate may alternatively or in addition to the potassium salts be incorporated in the core of an electrode according to the present invention.

It is to be appreciated that if an acidic flux-forming material is chosen for incorporation into an electrode according to the present invention it need not be a silicate or a titanate. Indeed, the flux forming material may in general without disadvantage comprise one or more oxides. Basic or amphoteric oxides may be used instead of acidic oxides. Suitable oxides are silica, titanium dioxide, manganese oxide, aluminium oxide, oxides of transition metals such as nickel, zirconium, molybdenum, iron, and chromium, and oxides of rare earths such as yttrium, cerium and lanthanum.

Although not preferred, both titanium dioxide and silicon dioxide may comprise the flux-forming material. If they do, however, the relative proportions of the two are preferably not greater than 0.5 parts by weight of titanium dioxide to 1 part by weight of silicon dioxide, and most preferably not greater than 0.2 parts by weight of titanium dioxide to 1 part by weight of silicon dioxide.

For many open-arc-welding applications a basic flux forming material is to be perferred to an acidic flux-forming material. This is because in the quantities in which the flux-forming material is present in electrodes according to the present invention electrodes with a given quantity of basic flux tend to deposit weld metal having metallurgical properties significantly superior to that deposited by equivalent electrodes having the same quantity of acidic flux. However, where the superiority in metallurgical properties of weld metal deposited by electrodes with basic flux-forming material over weld metal deposited by electrodes with acidic flux-forming material is not of significance the latter type of electrode is frequently to be preferred to the former. This is because for a given shielding gas, electrodes incorporating acidic flux-forming material tend to give a smoother arc action and less spatter than do electrodes incorporating basic flux-forming material.

A preferred basic flux-forming material is a fluoride or carbonate. In general, fluoride is preferred to carbonate, since the former is able to impart greater fluidity to the slag than is the latter. One particularly suitable fluoride is calcium fluoride which may be used in the form of the mineral fluorspar. Other fluorides, for example of alkaline metal earths other than calcium, or of alkali metals may, however, be used in combination with or alternatively to calcium fluoride. A suitable carbonate is calcium carbonate, which may conveniently be in the form of ground limestone. Other alkaline earth carbonates such as strontium carbonate, or alkali metal carbonates may, however, be used.

The electrode preferably contains from 0.14 to 0.28% by weight of basic flux-forming agent selected from fluorides and carbonates. If the content of fluoride and carbonate is kept within this range and when the electrode is employed in a gas-shielded open arc-welding process there is made possible deposition of weld metal with the formation of slag only in shallow friable deposits which cover only a small proportion of the surface of the weld. As a consequence the weld has a good appearance and shape, its surface being relatively smooth. Moreover, it is not necessary to chip away the slag before depositing another layer of weld metal on top of a previously-deposited layer. This saves considerable time in a multi-pass welding operation.

The tubular casing of the novel electrodes may consist for example of soft steel (such as rimming steel) or an alloyed steel e.g. 18-8 chromium/nickel steel. The casing may have different shapes e.g. it may be cylindrical with butting edges or it may have a complex cross-section with projections extending into the core. The casing can be obtained, for example, by the known method of longitudinally folding a strip around the core material.

Conveniently, the electrode of the invention is in the form of an endless wire for use in automatic or semi-automatic arc-welding processes.

The metal powder of the core is preferably mainly or entirely iron powder. However, if desired certain metal alloying powders may be added to the core. For example, nickel powder may be added to enhance the low temperature notch ductility of the deposited weld metal. Moreover if the steel to be welded contain such metals as chromium and molybdenum it may be desirable to include in the core chromium and molybdenum powders in order to produce a deposited weld metal having a composition complementary to that of the steel to be welded.

A preferred electrode for welding mild or medium tensile steels contains by weight of the total weight of the electrode at least 23.5% of iron in its core.

It is the relatively high proportion of metal powder in the electrode that makes possible the high deposition rates achievable therewith. With electrodes according to the present invention fillet welds of up to 6.3 mm leg length can be performed. For example, with a welding wire having a diameter of 2.4 mm it is possible to weld manually a fillet of 6 mm leg length at a speed of 0.66 meters per minute using a current of 460A. With an automatic welding machine the same size fillet has been welded at a speed of over 1 m a minute using a current of 550A.

The maximum possible content of metallic powder in the core will depend upon the proportion of the total weight of the electrode that is contributed by the core. It is desirable for the core to contribute at least 24% of the total weight of the electrode. If it is desired that the core should contribute more than, say, 35% of the total weight of the electrode difficulties may arise in forming the casing with a wall of sufficiently small radial cross-section. Regardless of whatever are the relative proportions by weight of the core and the casing the low flux content of electrodes according to the present invention makes possible a core at least 80% and preferably at least 85% by weight of which is constituted by iron powder.

Electrodes according to the present invention may typically have a diameter in the range 1.6 to 2.4 mm.

The manganese content of the electrode is desirably at least 1% of the total weight of the electrode and is preferably in the range 1.5 to 2.75% by weight of the total weight of the electrode. The manganese may be present in the core of the electrode as electrolytic manganese or in ferromanganese or silicomanganese. In addition, manganese may also if desired be present in the metallic casing of the electrode. The electrode desirably includes silicon as a second deoxidant. Provided that it is less than the manganese content, the silicon content of the electrode may be up to 2.0% of the total weight of the electrode but generally should not be so great as to provide in the deposited weld metal more than 40% of the total content of silicon and manganese in the deposited weld metal. Indeed, it may be advantageous to keep the silicon content of the electrode below 1% of the total weight of the electrode and to use in addition to the silicon and the manganese a third deoxidant typically selected from aluminium, magnesium, titanium and zirconium. Since the metals from which the third deoxidant is selected all exhibit a greater affinity for oxygen than does manganese or silicon, it is not necessary for the total weight of the silicon and the third deoxidant to be the same as the weight of silicon that would be included in the electrode if no third deoxidant were used.

It is preferred that from 1.5 to 4.25% by weight of the electrode is constituted by deoxidant, there being at least 1% by weight of manganese and in addition at least one other deoxidant selected from silicon, magnesium, aluminium, zirconium and titanium, the sum of the silicon content, expressed as a percentage of the total weight of the electrode, and twice the total content of zirconium, magnesium, aluminium and titanium, expressed as a percentage of the total weight of the electrode, being from 1 to 2%, the total silicon content of the electrode being less than the total manganese content. With a level of deoxidant in this range and with a content of basic flux-forming agent in the range 0.14 to 0.28% by weight of the total electrode, it is possible to deposit weld metal having superior metallurgical properties to that deposited by a cored electrode containing no flux-forming agent or, alternatively, an equivalent quantity of an acidic flux-forming agent such as potassium silicate.

It is to be appreciated that weld metal of the quality described in the previous paragraph may be deposited by electrodes which contain less than 20% by weight of metal powder. Moreover, the improvement in the nature of the slag formed during gas-shielded arc welding attributable to the nature and content of the flux-forming agent may also be achieved even if the electrode contains less than 20% by weight of metal powder.

According to another aspect of the present invention there is provided for gas-shielded electric arc welding or hard facing an electrode in the form of a flux-cored wire having a tubular casing of which the main constituent is iron; which casing contains dry core material comprising an intimate mixture of powdered metal, deoxidant and flux-forming agent, the electrode containing by weight of the total weight of the electrode:

0.14 to 0.28% of flux-forming agent selected from carbonates and fluorides;
at least 12% of metal powder:

1.5 to 4.25% of deoxidant, there being at least 1% of manganese and in addition at least one other deoxidant selected from silicon, zirconium, magnesium, aluminium and titanium, the sum of the silicon content, expressed as a percentage of the total weight of the electrode, and twice the total content of zirconium, magnesium, aluminium and titanium, expressed as a percentage of the total weight of the electrode, being from 1 to 2%, the total silicon content of the electrode being less than the total manganese content; the balance being provided by the tubular casing.

In a preferred electrode the silicon content is in the range 1.2 to 1.7 and the manganese content is in the range 1.8 to 2.75% by weight of the total weight of the electrode.

Preferred electrodes according to the present invention are suitable for welding steels in a tensile range of 400 to 620 $N/mm^2$ (26–40 tons per square inch).

An advantage of flux-cored welding wires according to the present invention is that they produce a weld metal with a particularly low hydrogen content. For example, wires containing fluoride as the sole flux forming ingredient in accordance with our invention after baking at about 200° C produce a weld metal with a hydrogen content less than 5 ml per 100g of weld metal whereas most conventional flux-cored wires after a similar baking process produce weld metal with a hydrogen content of 5 or more ml per 100g of weld metal.

An electrode according to the present invention also offers the advantage of making possible open-arc welding in horizontal-vertical, vertical and overhead positions as well as the downhand position.

The electrodes according to the present invention may be employed for a range of welding and hard surfacing applications. They are particularly suitable for normal gas shielded open-arc-welding processes.

In open-arc welding processes the shielding gas preferably includes argon. We have discovered that by using a shielding gas consisting mainly of argon together with a small proportion of carbon dioxide and, if desired, a small proportion of oxygen, the particulate fume content of the arc is less than it is when the main or sole consitituent of the shielding gas is carbon dioxide.

For example, welding with a shielding gas containing 5% by volume of $CO_2$ and 0.1% by volume of $O_2$ and the remainder being argon, the fume produced is approximately 50% of the fume that occurs when welding with a shielding gas consisting of $CO_2$. We have found that with a shielding gas mixture containing 5% by volume of $CO_2$ and if desired up to 1% of oxygen, the remainder being argon, an open-arc welding process using an electrode according to the present invention avoids the finger-type weld which is produced when using a welding wire containing no flux-forming material.

If the shielding gas contains more than 20% by volume of $CO_2$ the electrode may includes up to 0.3% by weight of an arc stabiliser of the flux forming agent alone does not give the desired arc stability. The arc stabiliser can be a compound of either an alkali metal or a rare earth.

When welding with an electrode according to the present invention an AC or DC power source may be used. If a DC power source is employed the electrode is preferably connected to the negative terminal of the source.

The invention will now be illustrated by reference to the following examples wherein all parts are expressed on a weight basis.

EXAMPLE 1

A core material for an electrode was made by adding 6 parts of an aqueous solution of potassium silicate (2 parts solid to 4 parts water) to 100 parts to a mixture of 10% silicomanganese (34% by weight Si, 66% by weight Mn), 8% ferrosilicon (50% by weight Si, (50% by weight Fe) and 82% iron powder. The resultant mixture was thoroughly agitated and then dried in an oven for 1 hour at 250/300° C. The dried blend was then encased in known manner in a casing of mild steel containing 0.4% by weight of Mn so as to give an electrode comprising 28% by weight of core material.

The electrode made as described having a diameter of 2.4 mm was employed in open arc welding with a gas shield 95% by volume of argon and 5% by volume of carbon dioxide and with a welding current of 550 A to deposit weld metal in the flat or horizontal positions at the rate of 24 lb per hour. The resultant welds were of excellent shape and the slag detachability was good. There was no excessive spatter.

EXAMPLE 2

An electrode of diameter 1.6 mm made as described in Example 1 was employed for welding in the vertical position using an open arc with a welding current in excess of 200 A and with a shielding gas of 95% by volume of argon and 5% by volume of carbon dioxide. Both butt and fillet welds of excellent appearance were obtained which were appreciably superior to those obtained under comparable conditions using either a 1.6 mm in diameter solid wire or a 1.6 mm diameter fluxcored wire containing the larger amount of slag-forming materials than did the electrode of the invention.

EXAMPLE 3

A core for an electrode was made by intimately mixing the following ingredients in the proportion stated:

| | |
|---|---|
| iron powder | 86.25 |
| ferrosilicon (50% by weight Si, 50% by weight Fe) | 3 |
| silicomanganese (34% by weight Si, 66% by weight Mn) | 10 |
| fluorspar | 0.75 |

The resultant mixture was dried and fed into a U-shaped strip of mild steel containing 0.4% by weight of manganese and approximately 0.07 by weight of carbon. The ends of the strip were then folded toward one another so as to enclose the mixture and to form an electrode as a wire containing 28% by weight of the wire of core material.

Electrodes were made with diameters of 2.0 mm and 2.4 mm. Test welds were performed using these electrodes and a shielding gas consisting of 95% by volume of argon and 5% by volume of oxygen. Tests on the resultant weld metal gave the results shown in Table 1.

The welds were of good appearance and slag was formed only in the form of shallow friable deposits which covered only a small proportion of the surface of the weld metal.

EXAMPLE 4

An electrode of 1.6 mm diameter was made according to the method described in Example 3. The electrode had the following composition:

| | % by weight of electrode |
|---|---|
| casing (mild steel) | 72% |
| core | 28% |

The core had the following composition

| | % by weight of core |
|---|---|
| iron powder | 83% |
| Fe Si (50% Fe 50% Si) | 6% |
| Si Mn (34% Si 66% Mn) | 10% |
| $CaF_2$ (fluorspar) | 1% |

Weld metal deposited from the electrode had the following metallurgical properties.

| | | |
|---|---|---|
| Tensile strength - 40 Ton/in$^2$ | | (620 N/mm$^2$) |
| Yield strength - 36 Ton/in$^2$ | | 560 N/mm$^2$ |
| Charpy V impact value: | | |
| 20° C | 72 ft lb | (98J) |
| 0° C | 57 ft lb | (77J) |
| −20° C | 30 ft lb | (41J) |

The welds were smooth and only a small part of their surfaces was covered by slag deposits. This slag was in the form of shallow friable deposits.

EXAMPLE 5

An electrode of 1.6 mm diameter was made according to the method described in Example 3. The electrode had the following composition:

| | % by weight of electrode |
|---|---|
| casing (mild steel) | 72% |
| core | 28% |

The core had the following composition

| | % by weight of core |
|---|---|
| Fe powder | 82% |
| ferrosilicon | 6% |
| silicomanganese | 10% |
| $CaF_2$ (fluorspar) | 2% |

Weld metal deposited from the electrode had the following properties.

| | | | |
|---|---|---|---|
| Tensile strength: 38 Ton/in$^2$ | | | (590N/mm$^2$) |
| Yield strength: 36 Ton/in$^2$ | | | (560N/mm$^2$) |
| Charpy V impact value | 20° C | 55 ft lbs | (75J) |
| | 0° C | 50 ft lbs | (68J) |
| | −20° C | 28 ft lbs | (38J) |

The welds were of good appearance with relatively little slag being deposited, though the results in this respect were not quite so good as those obtained with the electrodes of Examples 3 and 4.

EXAMPLES 6 to 14

The electrodes of Examples 6 to 14 below were all wires of 2.4 diameter and found to deposit weld metal having acceptable metallurgical properties for many general gas-shielded arc welding purposes. All the electrodes of examples 6 to 14 were prepared by the method described in Example 3 and all had a mild steel casing

TABLE 1

| | | | | | | Properties of weld deposited by the electrode of Example 3 | | | | | | | |
|---|---|---|---|---|---|---|---|---|---|---|---|---|---|
| | Amperes | Tensile | | | Reduction | Charpy 'V' notch impact values | | | | Typical deposit analysis % by weight | | | |
| Diameter | dc electrode negative | strength N/mm$^2$ (ton f/in$^2$) | Yield N/mm$^2$ (ton f/in$^2$) | Elongation % | of Area % | 20° C J(ft/lb) | 0° C J(ft/lb) | −10° C J(ft/lb) | −20° C J(ft/lb) | C | Mn | Si | Fe |
| 1.6 | 150–400 | | | | | | | | | | | | |
| 2.0 | 200–500 | 570 (37) | 490 (32) | 28 | 67 | 95 (70) | 65 (48) | 54 (40) | 40 (30) | 0.08 | 1.5 | 0.9 | balance |
| 2.4 | 325–600 | | | | | | | | | | | | | constituting 72% by weight of the total weight of the electrode, the balance being contributed by the flux. The electrodes of Examples 7, 8 and 13 were found to be particularly satisfactory with regard to weld appearance and arc action. The composition of the flux for each example was as follows:

EXAMPLE 6

|  | % by weight of the flux |
|---|---|
| Fe powder | 83.5 |
| FeSi | 6.0 |
| SiMn | 10.0 |
| LiF | 0.5 |

EXAMPLE 7

|  | % by weight of the flux |
|---|---|
| Fe powder | 83.5 |
| FeSi | 6.0 |
| SiMn | 10.0 |
| Feldspar | 0.5 |

EXAMPLE 8

|  | % by weight of the core |
|---|---|
| Fe powder | 83.5 |
| FeSi | 6.0 |
| SiMn | 10.0 |
| Strontium carbonate | 0.5 |

EXAMPLE 9

|  | % by weight of the core |
|---|---|
| Fe powder | 83.5 |
| FeSi | 6.0 |
| SiMn | 10.0 |
| $BaF_2$ | 0.5 |

EXAMPLE 10

|  | % by weight of core |
|---|---|
| Fe | 80.0 |
| FeSi | 6.0 |
| SiMn | 10.0 |
| iron oxide | 2.0 |
| $CaF_2$ (fluorspar) | 2.0 |

EXAMPLE 11

|  | % by weight of core |
|---|---|
| Fe | 80.0 |
| FeSi | 6.0 |
| SiMn | 10.0 |
| $KTiO_3$ | 2.0 |
| $CaF_2$ (fluorspar) | 2.0 |

EXAMPLE 12

|  | % by weight of core |
|---|---|
| Fe | 83.5 |
| FeSi | 6.0 |
| SiMn | 10.0 |
| $CaCO_3$ | 0.5 |

EXAMPLE 13

|  | % by weight of core |
|---|---|
| Fe | 82.0 |
| FeSi | 6.0 |
| SiMn | 10.0 |
| Ceric oxide | 2.0 |

EXAMPLE 14

An electrode of 2.4 mm diameter, 72% by weight of mild steel casing, 28% by weight of core was formed according to the method described in Example 1.
The core had the following composition:

|  |  |  |
|---|---|---|
| Fe powder | 84 | parts by weight |
| FeSi | 6 | " |
| SiMn | 10 | " |
| $KSiO_3$ | 2 | " |

Weld metal deposited from the electrode was found to have the following metallurgical property:

| Charpy V impact strength: |  |  |
|---|---|---|
| 20° C | 37 ft lbs | (50J) |
| 0° C | 24 ft lbs | (33J) |

EXAMPLE 15

The electrodes of Example 3 (1.6 mm diameter) were used to perform the following welds.

(a) a vertical butt joint of two 20 mm plates, were prepared to define therebetween a V-shaped gap of 60° included angle, the root gap being 2.4 mm.
(b) an overhead butt joint identical to (a);
(c) an overhead fillet weld of ¼ inch leg length;
(d) a horizontal-vertical fillet weld of 5/16 inch leg length using a 1½ inch electrode extension;
(e) a horizontal-vertical fillet weld of ¼ inch leg length using a 1½ inch electrode extension.

In each instance a shielding gas of 95% A and 5% $CO_2$ was used.
The results showing the fast weld speeds achieved are given in Table 2.

TABLE 2

| DIA (mm) | T | Run No. | Amps (DC Negative) | Wire Feed Speed (in/min) | Volts | Speed (in/min) | Arc Time (min/ft) | Weight Wire Used (kgs) Per ft weld | Gas Used $Ft^3$ | Remarks |
|---|---|---|---|---|---|---|---|---|---|---|
| (a) |  |  |  |  |  |  |  |  |  |  |
| 1.6 | 20mm | 1 | 190 | 96 | 15 | 10.0 | 1.20 | 0.043 | 0.7 | Welding Downwards |
|  |  | 2 | 190 | 96 | 15 | 2.0 | 6.0 | 0.216 | 3.5 | Welding Upwards |
|  |  | 3 | 190 | 96 | 15 | 2.5 | 4.8 | 0.176 | 2.8 | Welding Upwards |
|  |  | 4 | 190 | 96 | 15 | 2.5 | 4.8 | 0.176 | 2.8 | Welding Upwards |
|  |  | 5 | 190 | 96 | 15 | 2.0 | 6.0 | 0.216 | 3.5 | Welding Upwards |
| (b) |  |  |  |  |  |  |  |  |  |  |
| 1.6 | 20mm | 1 | 150 | 82 | 14 | 6.5 | 1.85 | 0.057 | 1.1 | Stringer Bead |
|  |  | 2 | 280 | 228 | 24 | 20.5 | 0.58 | 0.050 | 0.34 | Stringer Bead |
|  |  | 3–9 | 280 | 228 | 23 | 22.0 | 0.55 | 0.047 | 0.32 | Stringer Bead (2 beads per layer) |
|  |  | 10–12 | 280 | 228 | 23 | 27.5 | 0.44 | 0.038 | 0.26 | Stringer Bead (3 beads per layer) |
|  |  | 13 | 150 | 82 | 15 | 1.5 | 8.0 | 0.246 | 4.7 | Full Width Weave |
| (c) |  |  |  |  |  |  |  |  |  |  |
| 1.6 | ¼ in |  | 280 | 228 | 22 | 19.25 | 0.62 | 0.054 | 0.36 | Overhead Fillet |

Table 2-continued

| DIA (mm) | T | Run No. | Amps (DC Negative) | Wire Feed Speed (in/min) | Volts | Speed (in/min) | Arc Time (min/ft) | Weight Wire Used (kgs) Per ft weld | Gas Used Ft³ | Remarks |
|---|---|---|---|---|---|---|---|---|---|---|
|  |  |  |  |  |  |  |  |  |  | Metal Deposition Rate (lb/hr) |
| (d) 1.6 |  |  | 400 |  | 28 | 21.0 |  |  |  | 22 |
| (e) 1.6 |  |  | 400 |  | 28 | 35.0 |  |  |  | 22 |

For the avoidance of doubt where the deoxidiser is included in an alloy with a metal such as iron which is not a deoxidant, the non-deoxidising metal in the alloy is to be considered as being part of the metal powder rather than part of the deoxidiser.

If desired the deoxidiser may be included in an alloy with an alloying element such as nickel, molybdenum, chromium and vanadium.

We claim:

1. In an electrode for gas-shielded electric open-arc welding and hard facing wherein an electrode is in the form of a flux-cored wire having a tubular casing of which the main constituent is iron and which casing contains dry core material comprising an intimate mixture of powdered metal, deoxidant and flux forming agent, the improvement comprising providing an improved metal deposition rate by provision of an electrode containing by weight of the total electrode:
   about 0.08 to about 1.2% of the flux-forming agent;
   about 1 to about 5.25% of deoxidant;
   the weight of the core being about 24 to about 35% of the total weight of the electrode, the balance being provided by the tubular casing; and
   the core being about at least 80% iron powder by weight.

2. An electrode according to claim 1, in which the flux-forming agent is selected from the group consisting of silicates; titanates; silica; titanium dioxide; manganese oxide; aluminum oxide; oxides of nickel, zirconium, molybdenum, iron and chromium, fluorides, carbonates, and oxides of rare earths.

3. An electrode according to claim 2, in which the electrode contains 0.1 to 0.6% by weight of the total weight of the electrode of flux-forming agent.

4. An electrode according to claim 2, in which flux forming agent is calcium fluoride.

5. An electrode according to claim 2, in which the electrode contains from 0.14 to 0.28% by weight of the total weight of the electrode of flux-forming agent.

6. An electrode according to claim 1, in which the electrode contains by weight of the total weight of the electrode at least 23.5% of iron in its core.

7. An electrode according to claim 1, in which the electrode contains by weight of the total weight of the electrode at least 1% of manganese deoxidant.

8. An electrode according to claim 7, in which the manganese deoxidant content of the electrode is in the range 1.5 to 2.25% by weight of the total weight of the electrode.

9. An electrode according to claim 7, in which the electrode contains by weight of the total weight of the electrode from 1.5 to 4.25% of deoxidant, there being at least 1% by weight of manganese deoxidant and in addition at least one other deoxidant selected from the group consisting of silicon, magnesium, aluminum, zirconium and titanium, the sum of the weight of the silicon, expressed as a percentage of the total weight of the electrode and twice the total weight of said at least one other deoxidant selected from the group consisting of zirconium, magnesium, aluminum and titanium content, expressed as a percentage of the total weight of the electrode, being from 1 to 2% of the total weight of the silicon of the electrode and being less than the total weight of manganese.

10. An electrode according to claim 9, in which the weight of the manganese is in the range 1.8 to 2.75% by weight of the total weight of the electrode, and in which the weight of the silicon is in the range 1.2 to 1.7% by weight of the total weight of the electrode.

11. A flux-cored welding and hard surfacing electrode in the form of a flux-cored wire having a tubular casing of which the main constituent is iron and which casing is filled with dry core material comprising an intimate mixture of powdered metal, deoxidant and flux forming agent, the improvement comprising providing an improved metal deposition rate by provision of a core of about 24 to about 35% of the total weight of the electrode, the core comprising from about 70 to about 92.5% by weight of the core of at least one powdered metal, the at least one powdered metal comprising about at least 80% by weight of iron powder and from 0.25 to 4% by weight of the electrode comprising flux forming agent intimately distributed throughout the core material, substantially the remainder of the core being selected from metallic deoxidants and alloys of metallic deoxidants with iron and alloying metals.

12. In an electrode for gas-shielded electric arc welding and hard facing wherein an electrode is in the form of a flux-cored wire having a tubular casing of which the main constituent is iron and which casing contains dry core material comprising an intimate mixture of powdered metal, deoxidant and flux-forming agent, the improvement comprising providing an improved metal deposition rate and shallow friable discontinuous slag deposits by the provision of an electrode containing by weight of the total weight of the electrode:
   about 0.14 to about 0.28% of flux-forming agent selected from the group consisting of carbonates and fluorides;
   about 1.5 to about 4.25% of deoxidant, there being at least 1% by weight of the total weight of the electrode of manganese and, in addition, at least one other deoxidant selected from the group consisting of silicon, zirconium, magnesium, aluminum and titanium, the sum of the weight of the silicon, expressed as a percentage of the total weight of the electrode, and twice the total weight of said at least one other deoxidant selected from the group consisting of zirconium, magnesium, aluminum and titanium, expressed as a percentage of the total weight of the electrode, being from 1 to 2%, of the total weight of the electrode, the total weight of the silicon being less than the total weight of the manganese; and the weight of the core being about 24 to about 35% of the total weight of the electrode, the core being about at least 80% iron powder by weight.

13. In an electrode for gas-shielded electric open-arc welding and hard facing wherein an electrode is in the form of a flux-cored wire having a tubular casing of which the main constituent is iron and which casing contains dry core material comprising an intimate mixture of powdered metal, deoxidant and flux forming agent, the improvement comprising providing an improved metal deposition rate by provision of an electrode containing by weight of the total electrode:

about 0.08 to about 1.2% of the flux-forming agent;
about 1 to about 5.25% of deoxidant;
the weight of the core being about 24 to about 35% of the total weight of the electrode, the balance being provided by the tubular casing; and
the core being about at least 80% iron powder by weight, the metal powder consisting of iron powder and an alloying metal powder selected from the group consisting of chromium, molybdenum and nickel present in an amount to produce a deposited weld metal having a composition complementary to that of an alloy steel to be welded.

* * * * *